(12) United States Patent
Paddock

(10) Patent No.: US 11,192,517 B2
(45) Date of Patent: Dec. 7, 2021

(54) CURTAIN AIRBAG INCLUDING EXTERNAL CINCHING LOOP

(71) Applicant: Ford Global Technologies, LLC, Dearborn, MI (US)

(72) Inventor: Jeffrey C. Paddock, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 136 days.

(21) Appl. No.: 16/686,580

(22) Filed: Nov. 18, 2019

(65) Prior Publication Data

US 2021/0146872 A1 May 20, 2021

(51) Int. Cl.
*B60R 21/232* (2011.01)
*B60R 21/2338* (2011.01)
*B60R 21/213* (2011.01)

(52) U.S. Cl.
CPC .......... *B60R 21/232* (2013.01); *B60R 21/213* (2013.01); *B60R 21/2338* (2013.01); *B60R 2021/23386* (2013.01)

(58) Field of Classification Search
CPC .............. B60R 21/232; B60R 21/2338; B60R 2021/23386; B60R 21/213
See application file for complete search history.

(56) References Cited

U.S. PATENT DOCUMENTS

| | | | |
|---|---|---|---|
| 6,135,490 A * | 10/2000 | Spary .................... | B60R 21/213 280/730.2 |
| 6,676,154 B2 | 1/2004 | Fischer | |
| 7,347,450 B2 | 3/2008 | Williams et al. | |
| 7,568,729 B2 * | 8/2009 | Schnieder ........... | B60R 21/2338 280/736 |
| 7,597,355 B2 * | 10/2009 | Williams ............ | B60R 21/2338 280/739 |
| 7,614,654 B2 * | 11/2009 | Williams ............ | B60R 21/2338 280/743.1 |
| 7,712,773 B2 * | 5/2010 | Walston .................. | B60R 21/08 280/730.2 |
| 7,980,585 B2 * | 7/2011 | Cheal .................... | B60R 21/201 280/728.2 |
| 8,056,924 B2 * | 11/2011 | Hatfield ................ | B60R 21/201 280/730.2 |
| 8,641,088 B2 * | 2/2014 | Wiik ..................... | B60R 21/213 280/730.2 |
| 8,714,587 B2 | 5/2014 | Nakamura et al. | |
| 8,770,619 B2 * | 7/2014 | Nakamura ........... | B60R 21/213 280/730.2 |
| 8,851,508 B1 * | 10/2014 | Rickenbach .......... | B60R 21/239 280/729 |
| 10,442,387 B2 * | 10/2019 | Yamane .............. | B60R 21/2338 |
| 10,773,679 B2 * | 9/2020 | Jeong .................. | B60R 21/2338 |
| 2019/0106074 A1 | 4/2019 | Jeong et al. | |
| 2020/0324731 A1 * | 10/2020 | Kang .................... | B60R 21/213 |

\* cited by examiner

*Primary Examiner* — Jonathan Ng
*Assistant Examiner* — Joselynn Y Sliteris
(74) *Attorney, Agent, or Firm* — Frank A. MacKenzie; Bejin Bieneman PLC

(57) ABSTRACT

An assembly includes an airbag having an inflation chamber. The inflation chamber is defined by a first inflatable section, a second inflatable section, and a duct fluidly connecting the first inflatable section and the second inflatable section. A tether is external to the inflation chamber. The tether has a cinching loop encircling the duct. The tether has a tail extending from the cinching loop and the tail is fixed to the airbag.

15 Claims, 7 Drawing Sheets

CURTAIN AIRBAG INCLUDING EXTERNAL CINCHING LOOP

BACKGROUND

A vehicle may include one or more curtain airbags deployable during a vehicle impact to control kinematics of occupants inside the vehicle during the impact. The curtain airbag may be a component of an airbag assembly including an inflator in communication with the curtain airbag for inflating the curtain airbag from an uninflated position to an inflated position. The curtain airbag may be mounted to the roof rail and is inflatable along the side of an occupant toward the vehicle floor, specifically along the head and/or the torso of the occupant. The curtain airbag, for example, may be inflatable between the occupant and the vehicle door.

DETAILED DESCRIPTION

Figure 1:
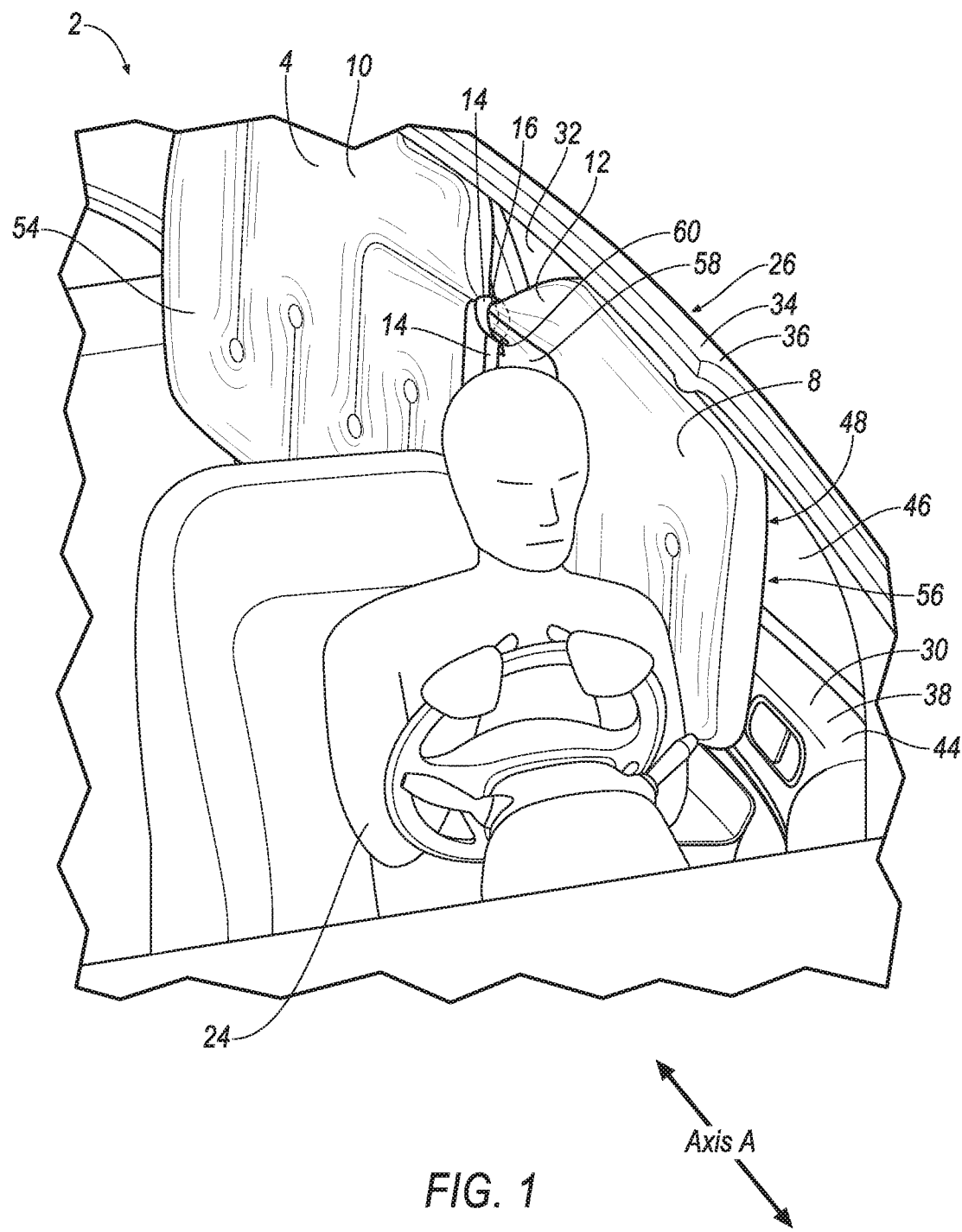
FIG. 1 is a perspective view of a vehicle including an airbag assembly in an inflated position.

An assembly includes an airbag having an inflation chamber. The inflation chamber is defined by a first inflatable section, a second inflatable section, and a duct fluidly connecting the first inflatable section and the second inflatable section. A tether is external to the inflation chamber. The tether has a cinching loop encircling the duct. The tether has a tail extending from the cinching loop and the tail is fixed to the airbag.

The airbag may include a non-expandable region abutting the first inflatable section, the second inflatable section, and the duct. The non-expandable region may have an opening adjacent the duct, and the tether may extend through the opening.

The tail may be fixed to the non-expandable region.

The tether may include a terminal end spaced from the tail and a hole adjacent the terminal end, the cinching loop being looped from the terminal end through the hole to the tail.

The duct may provide the only fluid communication between the first inflatable section and the second inflatable section.

The assembly may be inflatable from an uninflated position to an inflated position. The tail in the inflated position may be spaced farther from the duct than in the uninflated position.

The assembly may include a roof rail. The airbag may be supported by the roof rail and inflate away from the roof rail from an uninflated position to an inflated position. In the inflated position, the tail may be spaced farther from the roof rail than in the uninflated position.

The assembly may include a front door and a rear door. The first inflatable section may be adjacent the front door and the second inflatable section may be adjacent the rear door when the airbag is in the inflated position.

The cinching loop may have a first circumference in the uninflated position and a second circumference in the inflated position. The second circumference may be smaller than the first circumference.

The first circumference of the cinching loop may allow gas to flow through the duct and the second circumference of the cinching loop may substantially close the duct.

The tether may include a hole. The cinching loop may extend from the hole to the tail. The tether may include a non-return feature fixed to one of the cinching loop and the hole and engageable with the other of the cinching loop and the hole in the inflated position to retain the cinching loop at the second circumference.

The non-return feature may be designed to move through the hole to a locked position as the airbag inflates to the inflated position and to resist movement through the hole in the locked position.

With reference to the Figures, wherein like numerals indicate like parts throughout the several views, an assembly of a vehicle 2 is generally shown. The assembly includes an airbag 4 having an inflation chamber 6. The inflation chamber 6 is defined by a first inflatable section 8, a second inflatable section 10, and a duct 12 fluidly connecting the first inflatable section 8 and the second inflatable section 10. A tether 14 is external to the inflation chamber 6. The tether 14 has a cinching loop 16 encircling the duct 12. The tether 14 has a tail 18 extending from the cinching loop 16 and the tail 18 is fixed to the airbag 4.

Figure 4A:
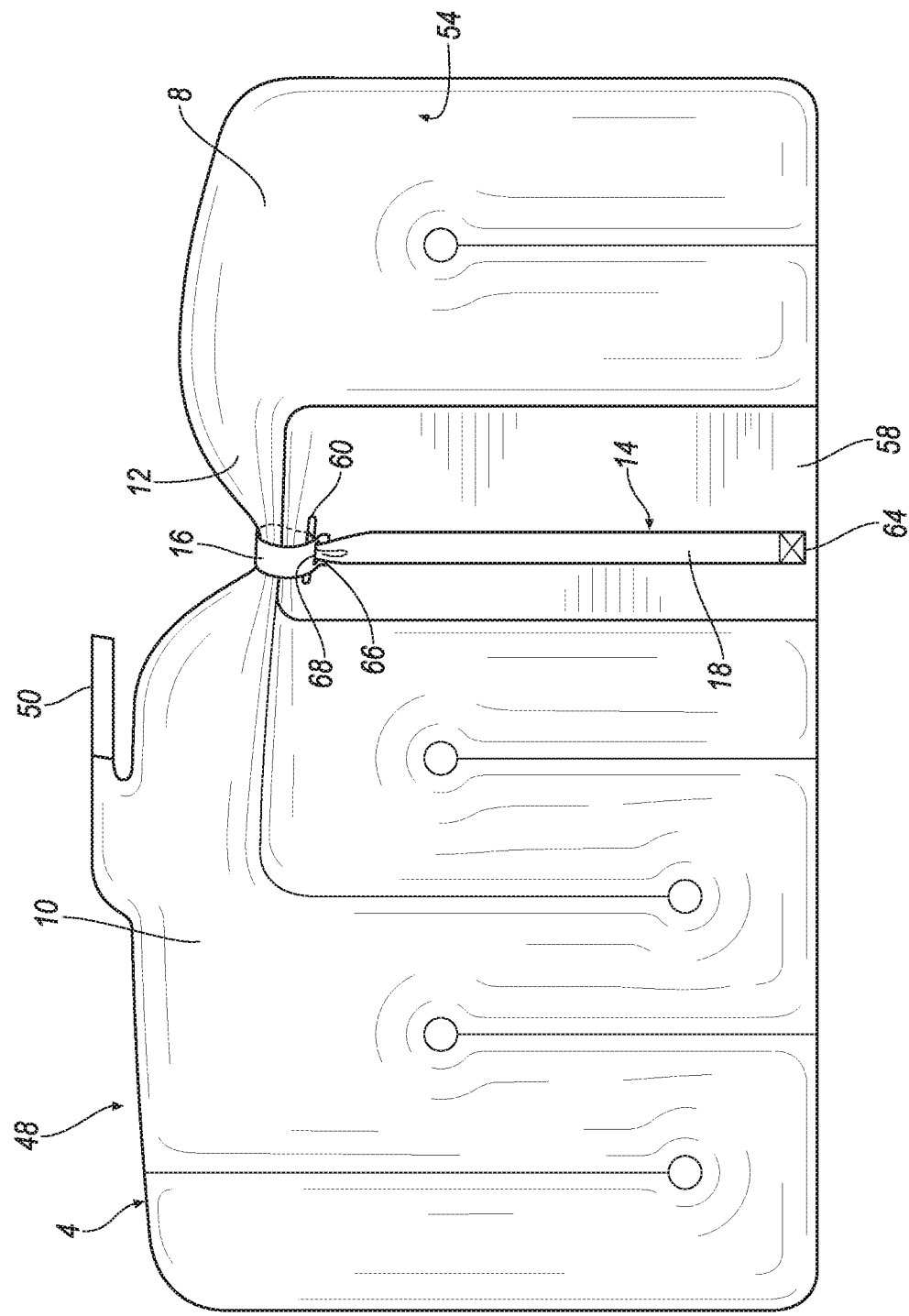
FIG. 4A is a side view of the airbag assembly inflated.
Figure 5:
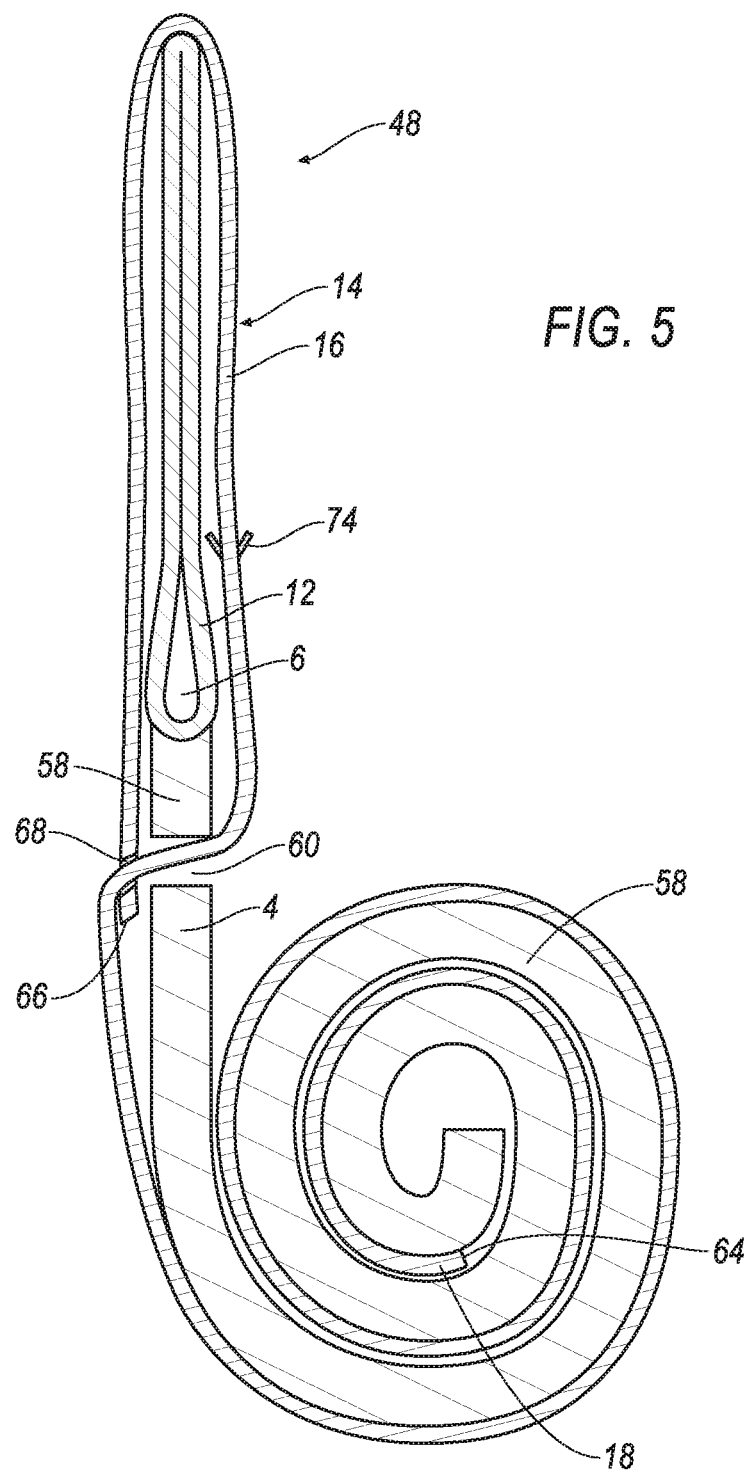
FIG. 5 is a cross-sectional view of the duct uninflated.

The airbag 4 is inflatable from an uninflated position (as shown in FIG. 5) to an inflated position (shown in FIGS. 1, 2, and 4A) to control the kinematics of a vehicle occupant 24. The duct 12 allows flow of inflation medium between the first inflatable section 8 and the second inflatable section 10 during inflation from the uninflated position to the inflated position. Since the tail 18 is fixed to the airbag 4, the airbag 4 pulls the tail 18 to tighten the cinching loop 16 around the duct 12 when the airbag 4 reaches the inflated position. Specifically, when the airbag 4 reaches the inflated position, the airbag 4 pulls the cinching loop 16 to close the duct 12 and prevent fluid communication through the duct 12. This prevents communication of a pressure change in one of the inflatable sections 8, 10 to the other of the inflatable sections 8, 10 through the duct 12. For example, if one of the inflatable sections 8, 10 is impacted by an occupant 24, the pressure in that inflatable section is increased and that pressure increase is not transmitted to the other inflatable section through the duct 12. Accordingly, the inflatable sections 8, 10 may be simultaneously inflated to the inflated position and isolated at the duct 12 in the inflated position.

Figure 2:
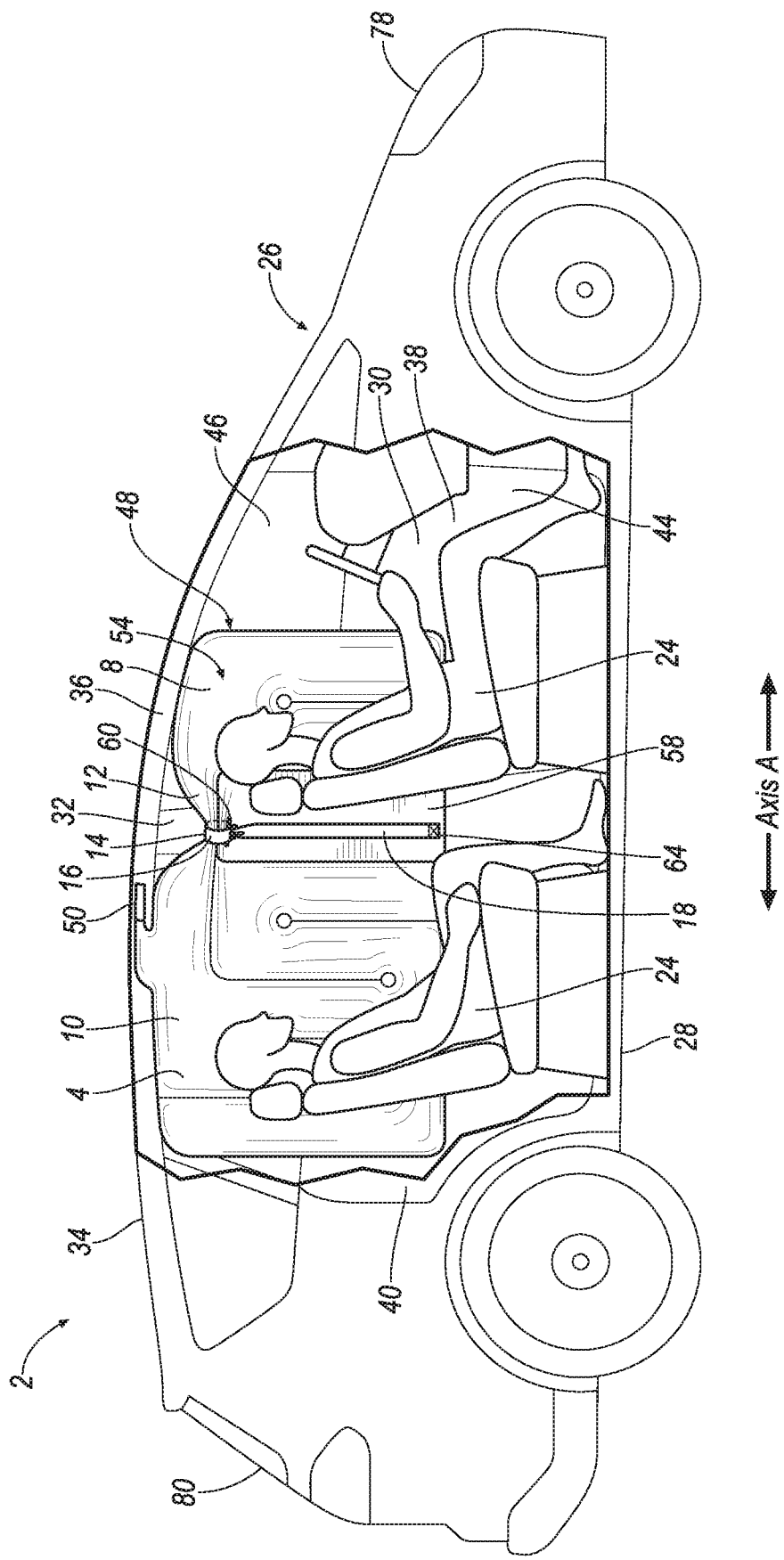
FIG. 2 is a side view of a vehicle including the airbag assembly in the inflated position.

The vehicle 2, as shown in FIGS. 1 and 2, may be any suitable type of automobile, e.g., a passenger or commercial automobile such as a sedan, a coupe, a truck, a sport utility vehicle, a crossover vehicle, a van, a minivan, a taxi, a bus, etc. The vehicle 2 has a vehicle-forward end 78 and a vehicle-rearward end 80 spaced from each other in a vehicle fore-and-aft direction A. The vehicle 2 has a body 26 including a floor 28, a door 30, a pillar 32, and a roof 34 spaced vertically from the floor 28.

The roof 34 may include a roof rail 36, as shown in FIGS. 1 and 2. The roof rail 36 may be elongated in the vehicle fore-and-aft direction A. The roof rail 36 may include metal (e.g., aluminum, steel, etc.), composite material, e.g., fiber reinforced thermoplastic, sheet molding compound (SMC), etc., or any suitable material. The airbag 4 may be supported by the roof 34, e.g., by the roof rail 36. As one example, the airbag 4 may be folded in the uninflated position, as shown in FIG. 5, and anchored directly or indirectly to the roof rail 36.

The airbag 4 may be inflatable away from the roof rail 36 from the uninflated position to the inflated position. As one example and as set forth above, the airbag 4 may be supported by the roof rail 36 in the uninflated position. In this example the airbag 4 may inflate from the uninflated position to the inflated position away from the roof rail 36 toward the floor 28. The airbag 4 is shown between the uninflated position and the inflated position in FIGS. 4A-B. The airbag 4 remains supported by the roof 34 in the inflated position.

The doors 30 of the vehicle 2 may include a front door 38 and a rear door 40. The front door 38 and the rear door 40 may be between the roof 34 and the floor 28. One of the inflatable sections 8, 10 may be adjacent the front door 38 and the other of the inflatable sections 8, 10 may be adjacent the rear door 40 in the inflated position. As one example, the first inflatable section 8 may be adjacent the front door 38 and the second inflatable section 10 may be adjacent the rear door 40 when the airbag 4 is in the inflated position. Adjacent the front door 38 or the rear door 40 means there is no intermediate structure between the airbag 4 and the front door 38 or the rear door 40. As an example, the first inflatable section 8 may abut the front door 38 and the second inflatable section 10 may abut the rear door 40 in the inflated position.

The front and the rear doors 38, 40 include a door outer, a door inner, and a trim panel 44. The door outer may be fixed to the door inner by flanging, welding, or in any other suitable fashion. The trim panel 44 is fixed to the door inner in any suitable way, e.g., threaded fasteners, clips, push-pins, Christmas tree fasteners, etc. The door outer and the door inner may be metal (e.g., aluminum, steel, etc.), composite material, e.g., fiber reinforced thermoplastic, sheet molding compound (SMC), etc., or any suitable material. The door outer may have a class-A surface facing exteriorly, i.e., a surface specifically manufactured to have a high-quality, finished aesthetic appearance free of blemishes. The trim panel 44 may be plastic, foam, leather, vinyl, etc. and combinations thereof. The trim panel 44 may have a class-A surface facing the passenger cabin, i.e., a surface specifically manufactured to have a high-quality, finished aesthetic appearance free of blemishes.

The front and the rear doors 38, 40 may include a window 46. The window 46 may be fixed between the door inner and the door outer. The window 46 may be moveable, for example the window 46 may move in the vertical direction. The window 46 may be glass, plastic, or other suitable material.

The pillar 32 may extend from the roof rail 36 to the vehicle floor 28. The pillars 32 may be positioned as A-pillars, B-pillars, C-pillars, etc. One pillar 32 of the body 26 may be between the front door 38 and the rear door 40, as shown in FIGS. 1 and 2. In this position, the pillar 32 is a B-pillar. The pillars 32 may be metal (e.g., aluminum, steel, etc.), composite material, e.g., fiber reinforced thermoplastic, sheet molding compound (SMC), etc., or any suitable material.

The vehicle 2 includes an airbag assembly 48. The airbag assembly 48 may include the airbag 4, the tether 14, and an inflator 50. As set forth above and shown in the Figures, the airbag 4 may be supported by the roof rail 36. The inflator 50 may be supported by the roof rail 36. As examples, the airbag 4 and the inflator 50 may be connected to the roof rail 36 with fasteners. In the example shown in the Figures, the airbag 4 is a curtain airbag.

The inflator 50 is in fluid communication with the airbag 4 to inflate the airbag 4. The inflator 50 expands the airbag 4 with an inflation medium, such as a gas, to move the airbag 4 from the uninflated position to the inflated position. The inflator 50 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 50 may be, for example, at least partially in the inflation chamber 6 to deliver inflation medium directly to the inflation chamber 6 or may be connected to the inflation chamber 6 through fill tubes, diffusers, etc. The inflator 50 may be, for example, a pyrotechnic inflator that uses a chemical reaction to drive inflation medium into the airbag 4. The inflator 50 may be of any suitable type, for example, a cold gas inflator.

The airbag 4 may be unitary, i.e., a single, uniform piece of material with no seams, joints, fasteners, or adhesives holding them together. As another example, the airbag 4 may include a plurality of segments, i.e., two or more, that are attached to each other in any suitable fashion, e.g., a plurality of panels attached by stitching, ultrasonic welding, etc.

The airbag 4 may be of any suitable material, e.g., a woven polymer. In other words, the airbag 4 may be fabric. The airbag 4 may be woven nylon yarn. For example, the airbag 4 may be a woven nylon, e.g., nylon 6, 6. Other suitable examples include polyester, polyether ether ketone (PEEK), polyetherketoneketone (PEKK), or any other suitable polymer. The woven polymer may include a coating such as silicone, neoprene, urethane, polyogranosiloxane, etc., for example, nylon 6, 6.

The airbag 4 may have an inboard side 54 and an outboard side 56. The outboard side 56 is adjacent the door inner, the inboard side 54 is opposite the outboard side 56, i.e., facing vehicle-inboard. The inboard side 54 faces occupants 24 and may be impacted by one or more occupants 24.

The first inflatable section 8, the second inflatable section 10, and the duct 12 define the inflation chamber 6. In other words, inflation medium from the inflator 50 inflates each of the first inflatable section 8, the second inflatable section 10, and the duct 12. As set forth above and further below, the duct 12 allows fluid communication between the first inflatable section 8 and the second inflatable section 10 before the airbag 4 reaches the inflated position.

The first inflatable section 8 and the second inflatable section 10 may be the same size or different sizes. As an example, the first inflatable section 8 may longer than the second inflatable section 10 in the vehicle-fore-and-aft directions A. The adjectives "first" and "second" are used with reference to the inflatable sections 8, 10 merely as identifiers and do not indicate order or importance. In the example shown in the Figures, the first inflatable section 8 is vehicle-forward of the second inflatable section 10. As another example, the second inflatable section 10 may be vehicle-forward of the first inflatable section 8.

As an example, the duct 12 may provide the only fluid communication between the first inflatable section 8 and the second inflatable section 10 (as shown in the example shown in the Figures). Specifically, the inflation medium travels from one of the first or the second inflatable sections 8, 10 to the other of the first or the second inflatable sections 8, 10 through the duct 12. As set forth above, the assembly may include one or more ducts 12.

The airbag 4 may have a non-expandable region 58. The non-expandable region 58 is not in fluid communication with the inflation chamber 6. In other words, the non-expandable region 58 is not inflated by the inflator 50 and does not expand. As an example, the inboard side 54 and the outboard side 56 may be connected to each other at the non-expandable region 58, e.g., by stitching, ultrasonic welding, etc.

The non-expandable region 58 may abut the first inflatable section 8, the second inflatable section 10, and the duct 12. In other words, the non-expandable region 58 may extend directly from the first inflatable section 8, the second inflatable section 10, and the duct 12. For example, the non-expandable region 58 may extend in the vehicle fore-and-aft direction A from the first inflatable section 8 to the second inflatable section 10 and may extend generally vertically from the duct 12 to a free end of the non-expandable region 58. In other words, the first expandable region, the second expandable region, and the duct 12 may be generally U-shaped around the non-expandable region 58.

As shown in FIGS. 3-5, the non-expandable region 58 may have an opening 60. The tether 14 extends through the opening 60. Specifically, the tail 18 of the tether 14 extends through the opening 60. The tail 18 may extend from the opening 60 to the first terminal end 64 along the inboard side 54 of the airbag 4, as shown in the Figures, or may extend from the opening 60 to the first terminal end 64 along the outboard side 56 of the airbag 4.

The opening 60 is adjacent the duct 12. In other words, the portion of the non-expandable region 58 between the opening 60 and the duct 12 does not impair operation of the cinching loop 16 to close the duct 12 in the inflated position.

Figure 3A:
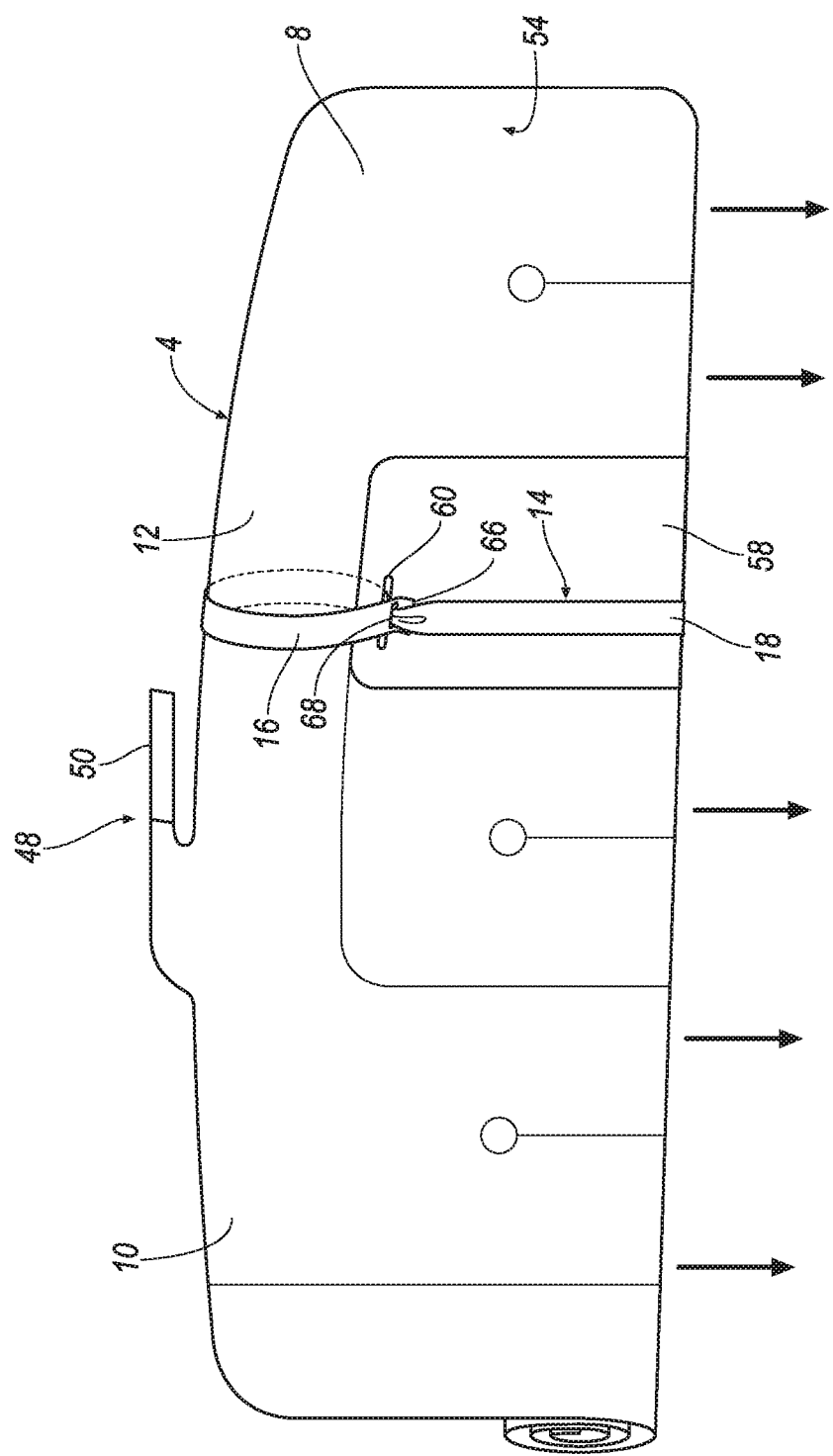
FIG. 3A is a side view of the airbag assembly during inflation from an uninflated position to an inflated position.
Figure 4B:
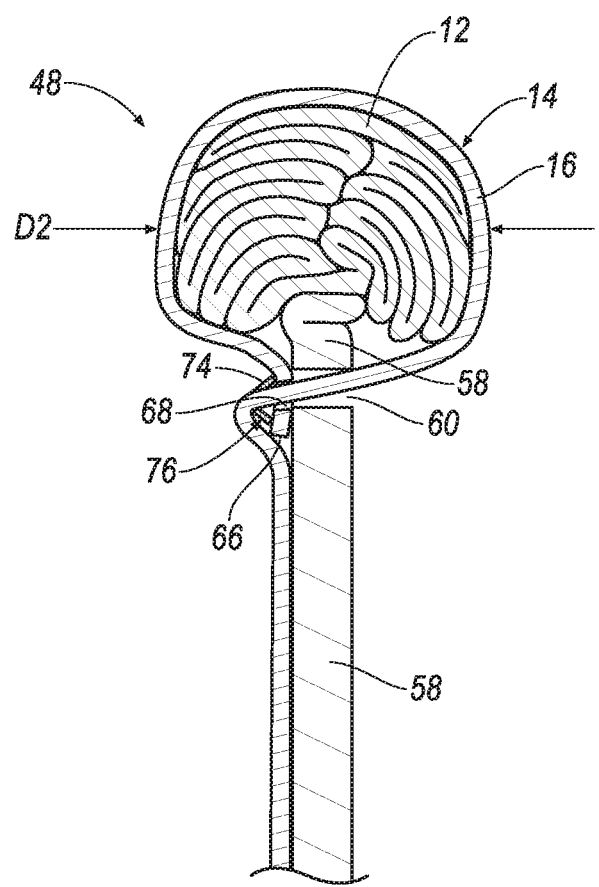
FIG. 4B is a cross-sectional view of the duct of FIG. 4A.

As set forth above, the tether 14 includes the cinching loop 16 and the tail 18 extends from the cinching loop 16. During inflation, the airbag 4 pulls the tail 18 from the uninflated position, as shown in FIG. 3A, to the inflated position, as shown in FIGS. 1, 2, and 4A. When the airbag 4 reaches the inflated position, the airbag 4 pulls the tail 18 which pulls the cinching loop 16 and closes the duct 12, as shown in FIG. 4B.

The airbag assembly 48 shown in the Figures includes one duct 12 and one tether 14 coupled to the duct 12. In other examples, the airbag assembly 48 may include more than one tether 14 coupled to the duct 12. In some examples, the airbag 4 may include more than one duct 12. In such examples, any combination of one or more ducts 12 may be coupled to a respective tether 14 or respective tethers 14.

The tether 14 is external to the inflation chamber 6. In other words, the tether 14 is on an exterior 62 of the airbag 4. Specifically, the cinching loop 16 and the tail 18 are external to the inflation chamber 6. Accordingly, as described further below, the cinching loop 16 compresses the duct 12 to close the duct 12 when the airbag 4 pulls the tail 18 in the inflated position.

The tail 18 extends from the cinching loop 16. The tether 14 is elongated, i.e., longer than wide and thick, from a first terminal end 64 to a second terminal end 66. The tether 14 is looped at the cinching loop 16. The tail 18 extends from the first terminal end 64 to the cinching loop 16, and the cinching loop 16 extends from the tail 18 to the second terminal end 66. The tether 14 may be unitary from the first terminal end 64 to the second terminal end 66, i.e., a single, uniform piece of material with no seams, joints, fasteners, or adhesives holding them together. The tether 14 may a woven polymer, i.e., a fabric. The tether 14 may be the same material as the airbag 4.

The tail 18 is fixed to the airbag 4. For example, the tail 18 may be fixed to the airbag 4 at the first terminal end 64. The tail 18 may be fixed to the airbag 4 by stitching, adhesives, fasteners, ultrasonic welding, or any other suitable manner. As one example, the tail 18 may be fixed to the non-expandable region 58 as shown in FIGS. 2 and 4A. As another example, the tail 18 may be fixed to the first inflatable section 8 or the second inflatable section 10.

The tail 18, e.g., the first terminal end 64, in the inflated position is spaced farther from the duct 12 than in the uninflated position. Specifically, the tail 18 is fixed to the airbag 4 at a location such that the tail 18 moves with the airbag 4 away from the duct 12 during inflation from the uninflated position to the inflated position. The relative position of the tail 18 and the duct 12 in the uninflated position is shown in FIG. 5 and the relative position of the tail 18 and the duct 12 in the inflated position is shown in FIG. 4A. In examples in which the airbag 4 is supported by the roof rail 36, the tail 18, e.g., the first terminal end 64, in the inflated position is spaced farther from the roof rail 36 than in the uninflated position.

As set forth above, the cinching loop 16 encircles the duct 12. In other words, the cinching loop 16 extends continuously around the duct 12, i.e., the cinching loop 16 is endless. The cinching loop 16 may be circular or non-circular in the uninflated position, the inflated position, and positions therebetween. The cinching loop 16 may be disconnected from the duct 12 such that the cinching loop 16 slides relative to the duct 12. As another example, the cinching loop 16 may be fixed to the duct 12, e.g., connected by stitching, ultrasonic welding, etc.

The tether 14 includes a hole 68 and the cinching loop 16 extends through the hole 68. The hole 68 may be adjacent the second terminal end 66. The tether 14 is looped from the second terminal end 66 through the hole 68 to the tail 18. During inflation of the airbag 4, the airbag 4 pulls the tail 18 through the hole 68, i.e., the tail 18 gets longer and the cinching loop 16 gets smaller. The circumference of the hole 68 is endless, i.e., the hole 68 encircles the cinching loop 16 and retains the cinching loop 16 in the hole 68 and allowing the cinching loop 16 to slide therethrough.

The cinching loop 16 has a first circumference in the uninflated position and a second circumference in the inflated position. The circumference is the length of the cinching loop from the hole 68 to the second terminal end 66. The second circumference is smaller than the first circumference. Similarly, the cinching loop 16 has a first diameter D1 in the uninflated position and a second diameter D2 in the inflated position. The second diameter D2 is smaller than the first diameter D1. In other words, the circumference and diameter of the cinching loop 16 decreases as the airbag 4 inflates to the inflated position. The first circumference may be equal to or greater than the circumference of the duct 12 when the duct 12 is inflated to its greatest possible cross-sectional area. Similarly, the first diameter D1 may be equal to or greater than the second diameter of the duct 12 when the duct is inflated to its greatest possible cross-sectional area. The cinching loop 16 at the first circumference allows fluid communication between the first inflatable section 8 and the second inflatable section 10 through the duct 12. Accordingly, inflation medium to inflate the airbag 4 may flow through the duct 12. For example, the inflator 50 may provide inflation medium to one of the inflatable sections 8, 10 and the other of the inflatable sections 8, 10 may be inflated by inflation medium flowing through the duct 12. In the example shown in the Figures, the second inflatable section 10 is inflated by the inflator 50 and inflation medium flows through the duct 12 from the second inflatable section 10 to the first inflatable section 8 to inflate the first inflatable section 8. An example of the first circumference is shown in FIGS. 3A-B and an example of the second circumference is shown in FIGS. 4A-B.

The second circumference of the cinching loop 16 compresses the duct 12 to substantially prevent fluid communication between the first inflatable section 8 and the second inflatable section 10 through the duct 12. In other words, the cinching loop 16 prevents equalization of pressure between the first inflatable section 8 and the second inflatable section 10 when the airbag 4 is in the inflated position and one of the inflatable sections 8, 10 is impacted by an occupant 24. Accordingly, in the inflated position the pressure of the first inflatable section 8 and the second inflatable section 10 are independent of each other.

Figure 3B:
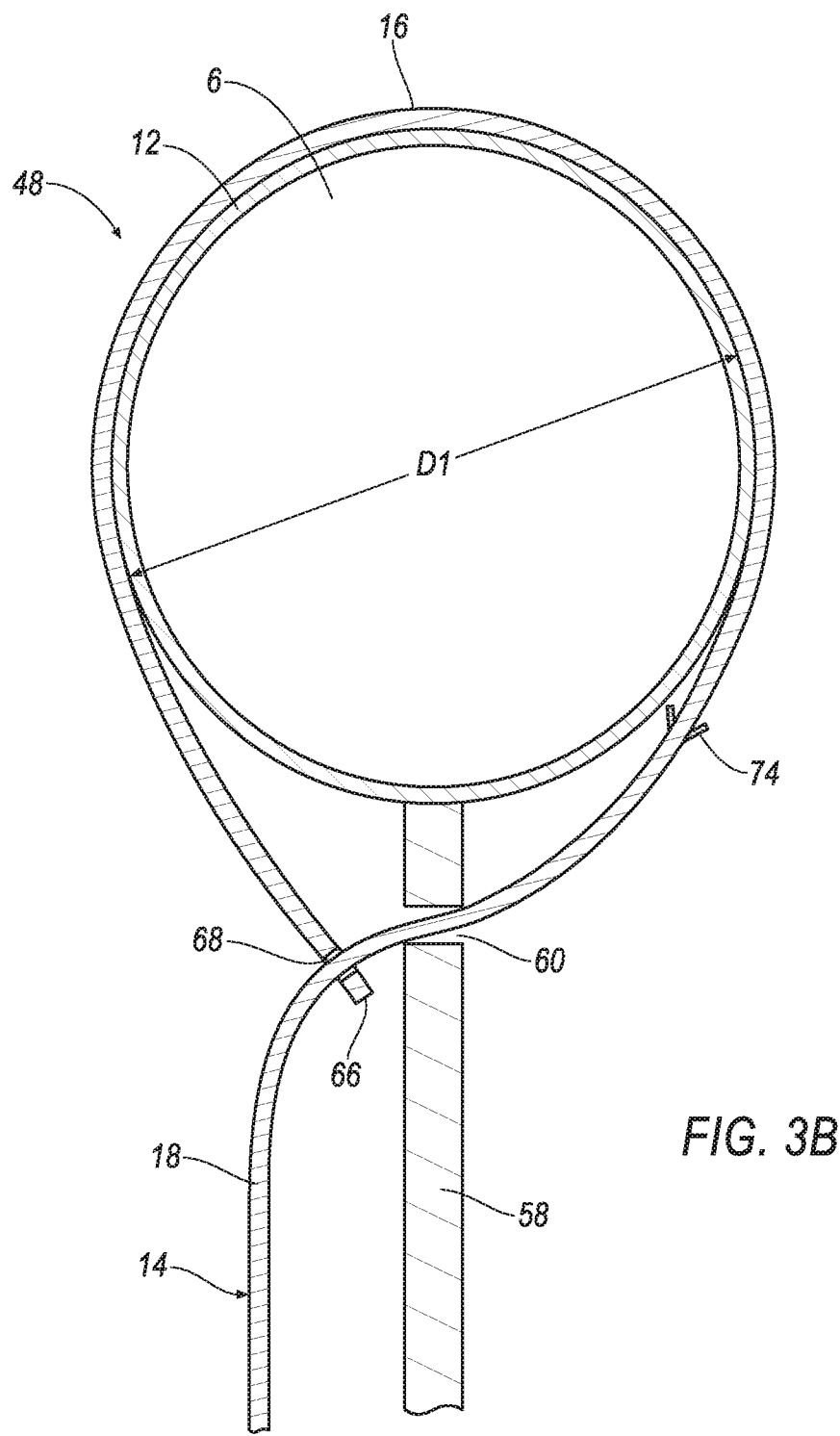
FIG. 3B is a cross-sectional view of the duct of FIG. 3A.

As shown in FIGS. 3B, 4B, and 5, the tether 14 includes a non-return feature 74 fixed to one of the cinching loop 16 and the hole 68 and engageable with the other of the cinching loop 16 and the hole 68 in the inflated position to retain the cinching loop 16 at the second circumference. The non-return feature 74 inhibits expansion of the cinching loop 16 when pressure is exerted on the duct 12, e.g., when an occupant 24 contacts the first or the second inflatable section 10, inflation medium may attempt to move through the duct 12.

In the example shown in the Figures, the non-return feature 74 is fixed to the cinching loop 16 and is engageable with the hole 68 in the inflated position. In such an example, the non-return feature 74 is designed to move through the hole 68 to a locked position 76 as the airbag 4 inflates to the inflated position and to resist movement through the hole 68 in the locked position 76. For example, the non-return feature 74 may include barbs that collapse as the non-return feature 74 moves through the hole 68 and that subsequently resiliently expands to prevent the non-return feature 74 from moving back through the hole 68. In other words, the barbs extend transversely from the cinching loop 16 at an acute angle away from the hole 68. The barbs are resiliently deformable toward the material of the cinching loop 16, i.e., to close the acute angle. As the barbs move into engagement with the hole 68, the barbs collapse, i.e., close the acute angle, to move through the hole 68 and subsequently resilient expand. After the barbs resilient expand, distal tips of the barbs are spaced from each other a greater distance than the size of the hole 68 such that the barbs prevent the non-return feature 74 from passing back through the hole 68. The non-return feature 74 may be of any suitable material, e.g., plastic, to collapse and resiliently expand.

In operation, the airbag 4 is inflated in response to a sensed vehicle impact. As set forth above, in the inflated position the airbag 4 is positioned to control the kinematics of the vehicle occupant 24. Specifically, when inflated from the uninflated position to the inflated position, the airbag 4 pulls the tail 18 of the tether 14. This pulls a portion of the cinching loop 16 through the hole 68 and tightens the cinching loop 16 about the duct 12. In the inflated position, the cinching loop 16 prevents fluid communication between the first inflatable section 8 and the second inflatable section 10 through the duct 12. This isolates the first inflatable section 8 and the second inflatable section 10 at the duct 12 to prevent equalization of pressure between the first inflatable section 8 and the second inflatable section 10 through the duct 12 when the airbag 4 is in the inflated position and one of the inflatable sections 8, 10 is impacted by an occupant 24. In examples including the non-return feature 74, the non-return feature 74 retains the cinching loop 16 tightened about the duct 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   an airbag having an inflation chamber defined by a first inflatable section, a second inflatable section, and a duct fluidly connecting the first inflatable section and the second inflatable section;
   a tether external to the inflation chamber, the tether having a cinching loop encircling the duct, the tether having a tail extending from the cinching loop, the tail being fixed to the airbag;
   the airbag being inflatable from an uninflated position to an inflated position, the cinching loop having a first circumference in the uninflated position and a second circumference in the inflated position, the second circumference smaller than the first circumference; and
   the first circumference of the cinching loop allows gas flow through the duct and the second circumference of the cinching loop substantially closes the duct.

2. The assembly of claim 1, further comprising a non-expandable region abutting the first inflatable section, the second inflatable section, and the duct, the non-expandable region having an opening adjacent the duct, the tether extending through the opening.

3. The assembly of claim 2, wherein the tail is fixed to the non-expandable region.

4. The assembly of claim 1, wherein the tether includes a terminal end spaced from the tail and the tether includes a hole adjacent the terminal end, the cinching loop being looped from the terminal end through the hole to the tail.

5. The assembly of claim 1, wherein the duct provides the only fluid communication between the first inflatable section and the second inflatable section.

6. The assembly of claim 1, wherein the tail in the inflated position is spaced farther from the duct than in the uninflated position.

7. The assembly of claim 1, further comprising a roof rail, the airbag supported by the roof rail and inflatable away from the roof rail from the uninflated position to the inflated position, the tail in the inflated position being spaced farther from the roof rail than in the uninflated position.

8. The assembly of claim 1, further comprising a front door and a rear door, the first inflatable section being adjacent the front door and the second inflatable section being adjacent the rear door when the airbag is in the inflated position.

9. The assembly of claim 1, wherein the tether includes a hole and the cinching loop extending through the hole to the tail, the tether including a non-return feature fixed to one of the cinching loop and the hole and engageable with the other of the cinching loop and the hole in the inflated position to retain the cinching loop at the second circumference.

10. The assembly of claim 1, wherein the tether includes a hole, the cinching loop extending through the hole to the tail, the tether including a non-return feature fixed to one of the cinching loop and the hole and engageable with the other of the cinching loop and the hole in the inflated position to retain the cinching loop at the second circumference.

11. The assembly of claim 1, wherein the tether includes a hole and the cinching loop, the tether including a non-return feature fixed to one of the cinching loop and the hole and engageable with the other of the cinching loop and the hole in the inflated position.

12. The assembly of claim 11, wherein the non-return feature is designed to move through the hole to a locked position as the airbag inflates to the inflated position and to resist movement through the hole in the locked position.

13. An assembly comprising:
an airbag having an inflation chamber defined by a first inflatable section, a second inflatable section, and a duct fluidly connecting the first inflatable section and the second inflatable section;
a tether external to the inflation chamber, the tether having a cinching loop encircling the duct, the tether having a tail extending from the cinching loop, the tail being fixed to the airbag; and
the tether includes a terminal end spaced from the tail and the tether includes a hole adjacent the terminal end, the cinching loop being looped from the terminal end through the hole to the tail.

14. The assembly of claim 13, further comprising a non-expandable region abutting the first inflatable section, the second inflatable section, and the duct, the non-expandable region having an opening adjacent the duct, the tether extending through the opening.

15. The assembly of claim 14, wherein the tail is fixed to the non-expandable region.

\* \* \* \* \*